J. T. WALSH.
VALVE.
APPLICATION FILED MAR. 18, 1918.

1,284,833.

Patented Nov. 12, 1918.

INVENTOR.
J. T. Walsh.
BY
R. D. Little
ATTORNEY.

UNITED STATES PATENT OFFICE.

JOHN T. WALSH, OF PITTSBURGH, PENNSYLVANIA.

VALVE.

1,284,833.  Specification of Letters Patent.  Patented Nov. 12, 1918.

Application filed March 18, 1918. Serial No. 223,041.

*To all whom it may concern:*

Be it known that I, JOHN T. WALSH, a citizen of the United States, and resident of Pittsburgh, in the county of Allegheny and State of Pennsylvania, have invented certain new and useful Improvements in Valves, of which the following is a specification.

My invention relates to valves for shutting off the flow of fluids through pipe lines, gas mains, and similar conduits, and more particularly to the valves on conduits used in conveying gaseous and vaporous fluids.

Ordinarily, such conduits are used to connect widely separated tanks or receptacles or as a means of communication between a source of gas supply and a receiver or burner in which the gases are purified or otherwise treated, or are burned. In such apparatus it is frequently necessary for workmen to enter the tanks or receivers and even the conduits, in order to make repairs or adjustments. It also ofttimes is necessary to replace defective gaskets or similar packing used in making tight joints in the pipe lines.

It is difficult, ordinarily, and with some gases it is impossible to shut mechanically closing valves tightly enough to absolutely prevent leakage, particularly of gases and vapors past or around the gate or shutter forming the closure of such valves.

Water seals have often been substituted for mechanically closing valves on gas mains for conducting highly heated blast furnace gases from the blast furnace to the dust catchers, gas washers and the hot blast stoves, steam boilers, or other place of use for the gases, in order to prevent leakage past the valve closure, which in this case is entirely formed by the water seal. In devices of this class, however, no provision is made to prevent bodily movement of the water or liquid forming the seal by the action of a sudden increase in the pressure. Such bodily movement results in the water seal becoming broken, and permits the gases to pass freely into the main beyond the point at which the water seal is located.

On account of the deadly nature of many of the fluids and gases or vapors handled in this manner, and the impossibility of entirely preventing leakage thereof past or around the closure within such valves as constructed heretofore, it has been the practice to close the valve and in addition to insert a head on the discharge side of the valve so as to "blank" the conduit beyond the valve, and in this way insure the safety of workmen against poisoning or even death, and to entirely avoid any danger to the workmen in what has heretofore been an extremely hazardous undertaking.

One object of my invention is the provision in a valve of a closure of novel construction having improved means whereby leakage of any gaseous or vaporous fluid past or around the closure is avoided and prevented.

Another object of this invention is the provision in a valve of a closure having novel means whereby leakage past or around the closure is prevented and the presence and absence of leakage is made apparent.

Another object of the invention is the provision in a valve of a closure having novel means whereby the possibility of leakage past or around the closure by increase in the pressure of the gases is avoided and overcome.

A further object of the invention is the provision of a valve having a liquid seal and having positive means for preventing bodily displacement of the sealing liquid.

A still further object of my invention is the provision of a valve having the novel constructions, arrangement, and combination of parts illustrated in the drawings, to be described in detail hereafter, and to be particularly pointed out in the appended claims.

Referring now to the drawings, forming part of this specification, Figure 1 is a side elevation showing a valve having a closure constructed and arranged in accordance with my invention.

Figure 8:
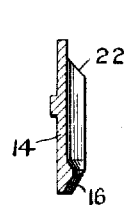

In the accompanying drawings, the numeral 2 designates the body of a gate valve embodying my invention and having a liquid sealed closure constructed and arranged in accordance with this invention, the valve body having flanges 3 and 4 on the inlet and outlet sides thereof by which the valve is secured in place on a pipe line or other conduit. The body 2 is provided with a detachable bonnet 5 connected to the valve body in the usual known manner, and the bonnet has a stuffing box 6 and gland 7 through which the rising valve stem 8 extends by which the valve disks or shutters 9 and 10 are moved in shifting the disks into and out of closed position.

The valve bonnet 5 is also provided with a yoke 11 and secured on the upper end of the yoke is a rotatable nut 12 having an internally threaded opening through which the screw threaded upper end of the valve stem 8 extends. A hand wheel 13 secured to the upper end of the nut 12 affords means to turn the nut in moving the disks 9 and 10 into and out of closing position within the valve body.

The disks 9 and 10 are loosely connected to wedging blocks 14 of which there is one for each disk, and the wedging blocks 14 are secured in the wedge yoke 15 forming part of the disk operating means.

Figure 7:
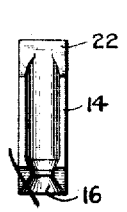
Fig. 7 is a plan and Fig. 8 a sectional side elevation showing further details in the construction of the wedging means used in mechanically operating the disks.
Figure 4:
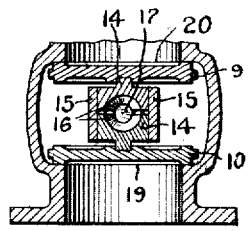
Fig. 4 is a sectional plan, on the line IV—IV of Fig. 2, showing details in the construction of the closure forming the novel feature of my invention.
Figures 5, 6:
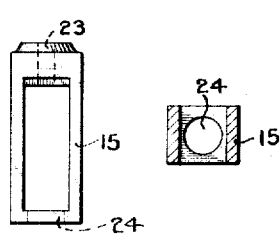
Fig. 5 is a plan and Fig. 6 is a sectional end elevation showing details in the construction of the wedging means employed in mechanically operating the disks or shutters forming part of the closure of my improved valve.

The opposite faces of the lower ends of the assembled wedging blocks 14 have downwardly converging recesses 16 therein (see Figs. 7 and 8), the opening formed by these recesses being adapted to encircle the frusto-conical upper end 17 of the projection 18 on the bottom of the valve body, so that in closing the valve, the disks 9 and 10 are forced outwardly away from each other into close contact with the faces of the valve seats 19 and 20 within the valve body. (See Fig. 2.) The upper ends of the wedging blocks 14 are beveled at opposite angles on the adjacent faces thereof, and the lower end of the valve stem 8 is provided with a wedge shaped projection 21 having tapering faces which engage with the beveled faces 22, 22 of the wedging blocks 14, and co-act with the conical surface of the projection 18 to move the wedging blocks 14 outwardly in parallel planes in forcing the valve disks 9, 10, into tight engagement with the valve seats 19, 20, when the valve stem 8 is moved downwardly by means of the nut 12 and hand wheel 13. The valve stem extends loosely through an opening 23 in one end of the wedge yoke 15 and the lower end of this yoke has a cylindrical opening 24 therein which slips over the cylindrical portion of the projection 18 in the bottom of the valve body 2.

The valve bonnet 5 is provided near its top with a tapped opening on one side into which a pipe 25 is screwed to supply water or other liquid to the interior of the valve body 2 and bonnet 5. The opposite side of the valve bonnet also has a tapped opening into which one end of an overflow pipe 26 is screwed, valves 27 and 28 being provided on the pipes 25, 26 to control the inflow and overflow of liquid to and from the interior of the valve body 2.

The valve body is provided with openings 29, 29, in opposite side walls at the lower end thereof, these openings normally being closed by means of heads 30 which are detachably secured in place by means of stud bolts 31, and a pet cock 32 in each of these heads form outlets to drain off the liquid used in sealing the closure of my improved valve, preparatory to opening the valve.

A gage glass 33 of any of the several known constructions, on the valve bonnet 2, provides means for visually indicating leakage and the absence of leakage past or around the disks 9 and 10 which form the positive means employed in preventing bodily movement of the liquid seal used in forming the closure of my improved valve.

Figure 2:
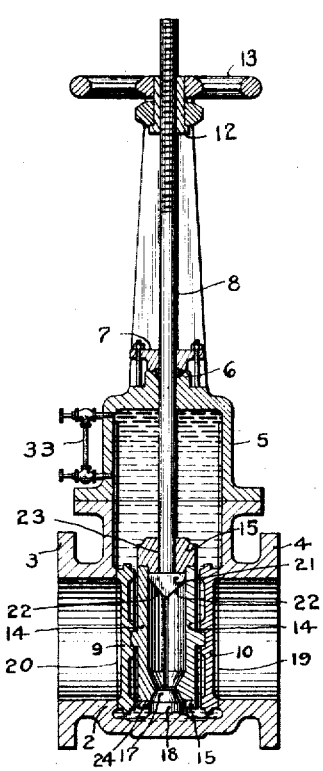
Fig. 2 is a sectional side elevation of the valve shown in Fig. 1, the section being taken on the line II—II of Fig. 1.
Figure 1:
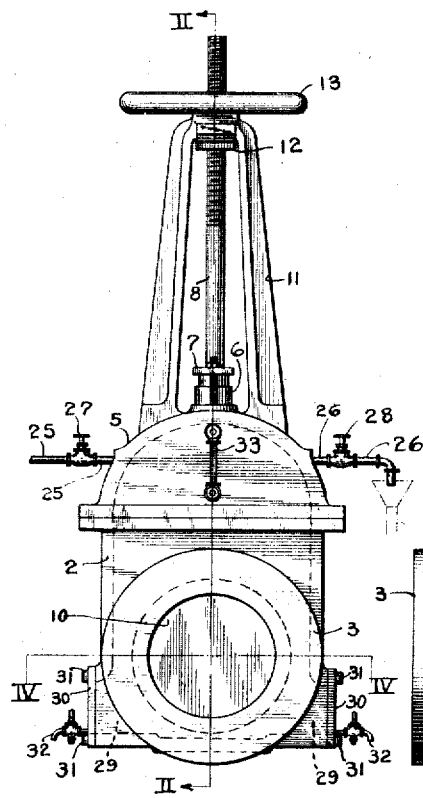
Figure 3:
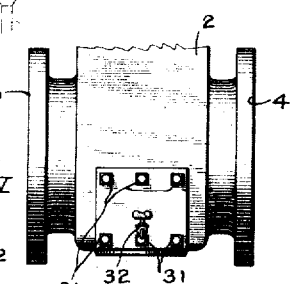
Fig. 3 is a side elevation of a portion of the valve of Figs. 1 and 2, showing details in the construction of the valve body.

The operation of my improved valve, which will be readily understood, will now be described. When it is desired to stop the flow of fluid through the conduit to which the valve is applied for use, the hand wheel 13 will be turned so as to lower the disks 9 and 10 from open position within the valve bonnet 5 into the valve body 2, until the closed position shown in Fig. 2 is reached. As the disks approach the position shown in Fig. 2, the wedging blocks 14, 14 engage with the frusto-conical end 17 of the projection 18 in the bottom of the valve body, and the tapering surfaces on the projection 21 on the lower end of the valve stem 8 engage with the contacting beveled surfaces 22, 22 on the upper end of the wedging blocks 14. Continued rotation of the hand wheel forces the valve stem downwardly relative to the disks 9, 10, and through the wedging blocks 14 forces the disks outwardly into tight engagement with the contacting seats 19, 20 on the valve body.

The globe valve 27 is then opened so as to admit water or other liquid, preferably under considerable pressure, to the interior of the valve body, the space within the valve body and bonnet being filled with liquid, as is indicated in Fig. 2. When the liquid begins to run from the overflow outlet, the globe valve 28 is closed and when necessary or desirable, the valve 27 also may be closed.

After the valve bonnet is filled with liquid to the level of the overflow outlet formed by the pipe 26, and the valves 27, 28 on the water inlet and overflow outlet are closed, observations will be made to see whether or not the level of the water within the valve body remains constant.

When no change occurs in the water level, such fact indicates the absence of any leakage whatever around the disks 9, 10, forming part of the closure of my improved valve. Should the water level fall within the valve body, such fact will be indicated by the gage glass 33 and will make it manifest that the valve is not tightly closed and that there is leakage past or around the valve disks 9, 10. In such case the hand wheel 13 will be turned to wedge the disks more tightly against the valve seats or a substance which has the property of swelling when moistened or wetted, such as linseed, may be inserted within the valve body to aid in tightly closing the valve.

When it is desired to open the valve the pet cocks 32 are opened and the liquid within the valve body is drained off, after which the hand wheel 13 is turned to first loosen and then lift the valve disks 9, 10 until positioned within the valve bonnet 5.

The above described operations are then repeated in closing and opening the valve, as occasion demands.

The advantages of my invention, which will be appreciated by those skilled in the art arise from the provision of a valve having a closure which can be made absolutely gas tight and leakage proof, and in which the presence as well as the absence of leakage past the closure is indicated.

Modifications in the construction and arrangement of the valve and valve closure may be made without departing from my invention as defined in the appended claims. The valve may be applied to a vertically extending pipe or main by changing the location of the gage glass on the valve. The liquid seal forming part of my improved valve closure may be employed with single seat gate valves as well as with the double seat valve shown, and the liquid seal and indicator also is applicable to valves other than the type illustrated.

I claim:—

1. A valve comprising a valve body, a mechanically operated closure therefor, a liquid seal for said closure, said closure forming means for preventing bodily movement of said liquid within the valve body, and means for indicating the absence of leakage past said closure.

2. A valve comprising a valve body, a mechanically operated closure therefor, means for filling the valve body with liquid to form a seal for said closure, said closure being arranged to prevent bodily movement of said liquid within the valve body, means for indicating leakage of liquid past said closure, and means for removing said liquid preparatory to opening said valve.

3. A valve comprising a valve body, a mechanically operated closure therefor, means for supplying liquid under pressure to form a seal for said closure, said closure being arranged to prevent bodily movement of said liquid within the valve body, and means for removing said liquid preparatory to opening said valve.

4. A valve comprising a valve body, a mechanically operated closure therefor, means for supplying and maintaining liquid under pressure to form a seal for said closure, said closure being arranged to prevent bodily movement of said liquid within the valve body, and means for removing said liquid preparatory to opening said valve.

5. A valve comprising a valve body, a sliding gate within said body to mechanically close the valve, and a liquid seal within the valve body to augment the closing effect of the said gate and prevent leakage of gaseous fluid through said valve body.

6. A valve comprising a valve body, a sliding gate within said body to mechanically close the valve, a liquid seal within the valve body to augment the closing effect of the said gate and prevent leakage of gaseous fluid through said body, and means whereby leakage within the sealed valve is indicated.

7. A valve comprising a valve body having a seat, said body having inlet and outlet openings, a slidable gate coacting with said seat in closing the valve, a liquid seal forming a fluid tight joint between the valve seat and gate when the gate is in closing position, and means for maintaining the liquid under pressure in forming the liquid seal.

8. A valve comprising a valve body having a seat, said body having inlet and outlet openings, a slidable gate coacting with said seat in closing the valve, a liquid seal forming a fluid tight joint between the valve seat and gate when the gate is in closing position, and means for removing the liquid preparatory to opening the valve.

9. A valve comprising a bonneted body, said body having opposite substantially parallel seats therein, disks forming a reciprocating double seating gate between the seats, the outer faces of said gate engaging said seats when in valve closing position, means for actuating said gate, and a liquid seal between the valve seats to augment the closing effect of said gate and prevent leakage of gaseous fluid through the valve.

10. A valve comprising a bonneted body, a double seated gate within said body, a liquid seal to augment the closing effect of said gate and prevent leakage of gaseous fluid past said gate, and means for removing said liquid seal preparatory to opening the valve.

11. A valve comprising a bonneted body, a double seated gate within the body, means for moving said gate and body into closed position, means for filling said body with liquid to seal said gate and prevent leakage of gaseous fluid past the closure formed by said gate and liquid seal, and means for removing said liquid preparatory to lifting the gate into open position.

12. A valve comprising a bonneted body, a double seated gate within the body, means for moving said gate and body into closed position, means for filling said body with liquid to seal said gate and prevent leakage of gaseous fluid past the closure formed by said gate and liquid seal, means for indicating the absence of leakage in said valve body, and means for removing said liquid preparatory to lifting the gate into open position.

In testimony whereof I have hereunto set my hand.

JOHN T. WALSH.